United States Patent Office 3,290,001
Patented Dec. 6, 1966

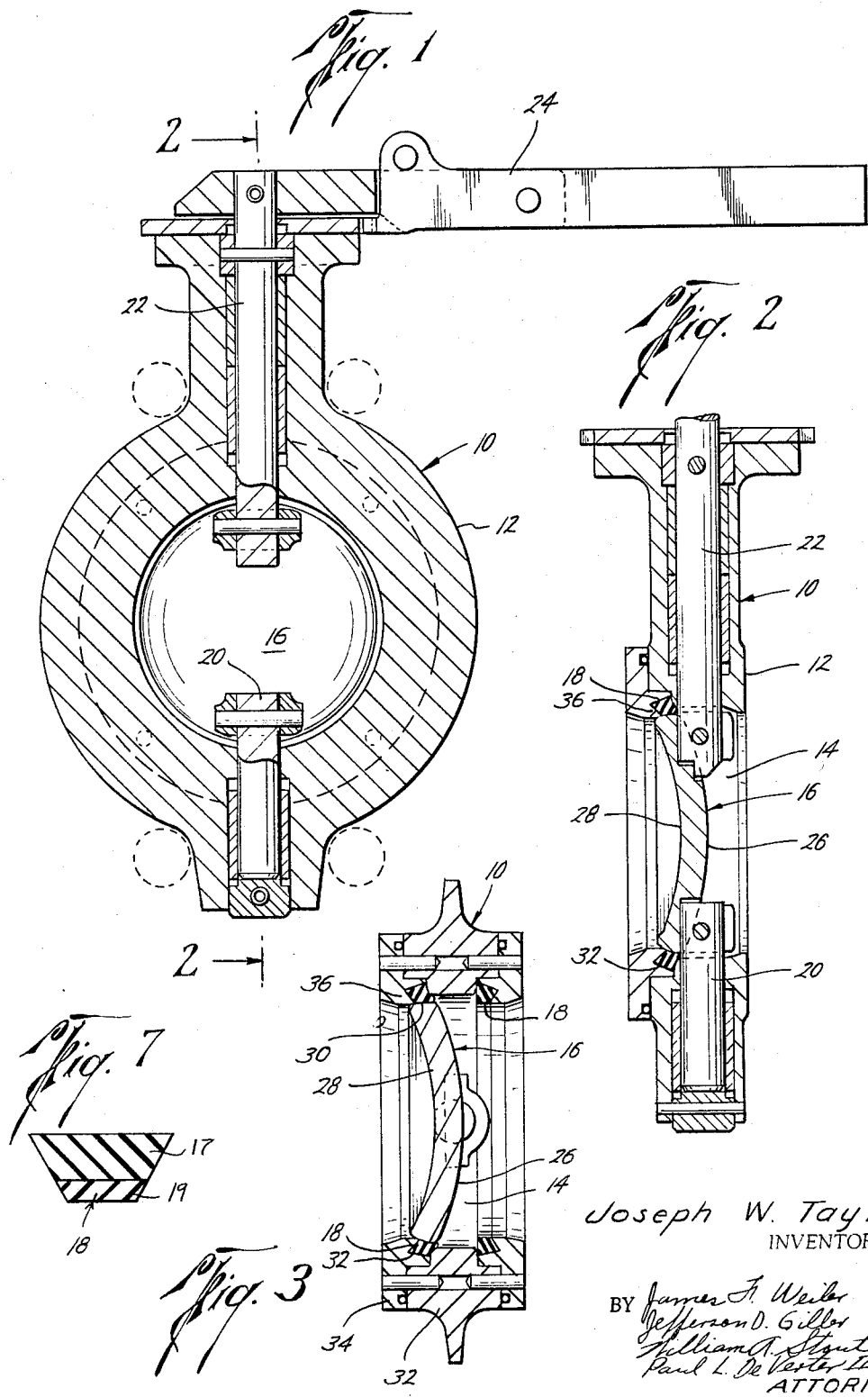

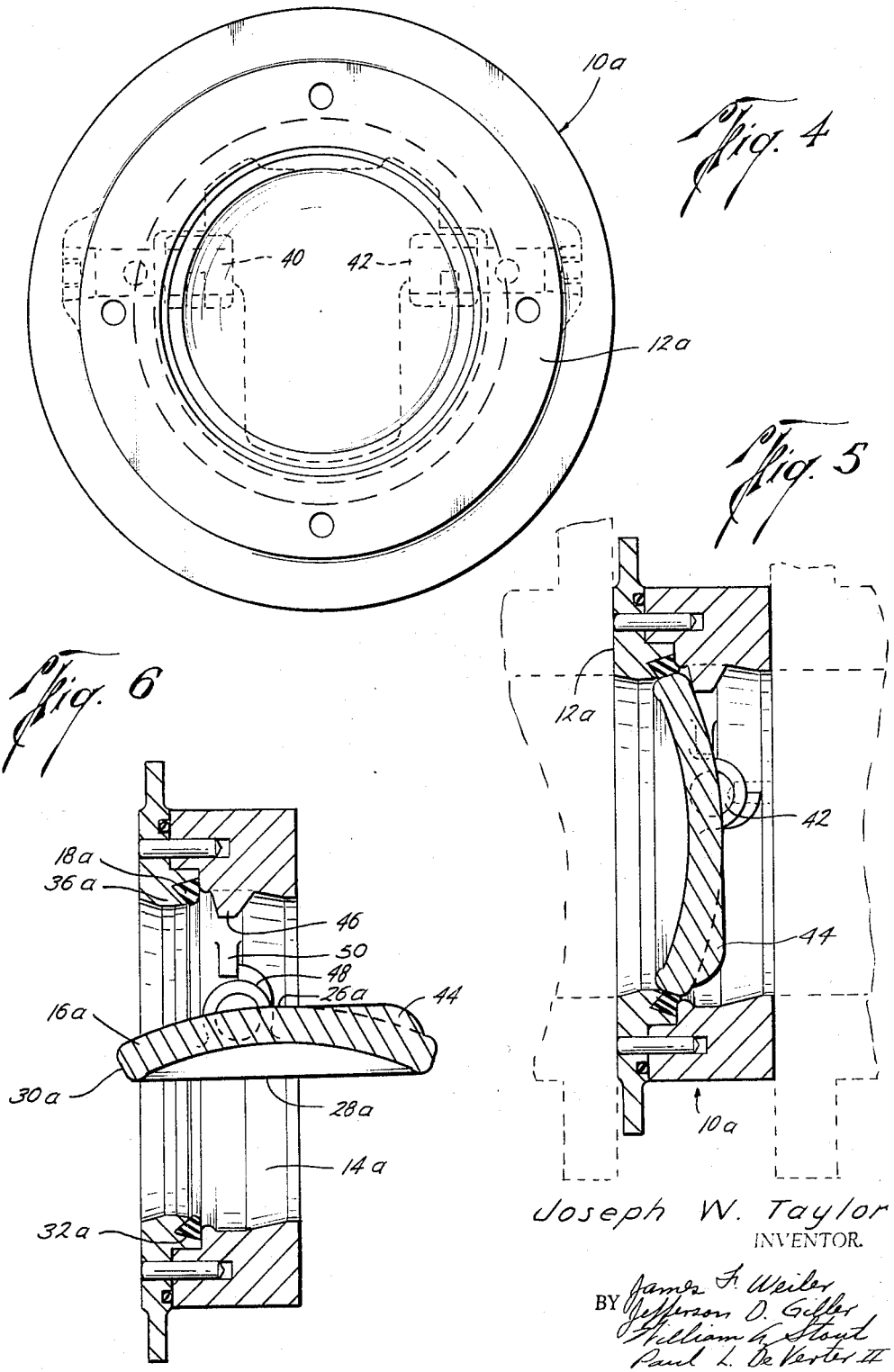

3,290,001
FLUID PRESSURE VALVE HAVING
DIVERSE MATERIAL SEAL
Joseph W. Taylor, Houston, Tex., assignor, by mesne assignments, to Daniel Industries, Inc., Houston, Tex., a corporation of Texas
Filed Jan. 22, 1964, Ser. No. 339,441
1 Claim. (Cl. 251—175)

The present invention relates to a valve for controlling fluid flow including the flow of liquids, gas and flowable solids, and more particularly relates to a valve wherein the valve disc member is dish shaped and includes an improved seating surface and sealing means to provide an improved valve.

The improved valve structure of the present invention may be used in various types of valves such as check valves and butterfly valves. The present invention generally utilizes a dish-shaped valve member which may be positioned in its closed position with the convex portion directed upstream so that as the fluid pressure acts on the convex portion the sealing force of the seating surface on the valve member is increased as the valve member flexes due to the fluid pressure acting on its convex portion. The present invention is directed to various improvements in such a valve which coacts with the dish-shaped valve member to provide high sealing pressures and which has great durability.

It is therefore a general object of the present invention to provide a valve having a valve member rotatably supported in the valve body for seating and sealing the valve on an annular sealing ring in which the seating surface on the valve member is shaped in cross section as a segment of a sphere whereby the spherical seating surface is positioned to contact the seating member pressing it outwardly instead of in a direction so as to extrude the annular seal downstream.

A still further object of the present invention is the provision of a dish-shaped valve member rotatably supported in a valve passageway for seating on a sealing member which is recessed in the valve body and wherein the recess and said sealing member positioned therein are trapezoidally shaped in cross sections thereby securely holding the annular sealing member in place even in the event of large pressure differentials across the valve member.

A still further object of the present invention is the provision of a valve body having a passageway therethrough, a dish-shaped valve member rotatably supported in the passageway for opening and closing the passageway wherein an annular sealing member is positioned in a recess in the valve body in a plane perpendicular to the body, but the vertical axis of the cross section of the recess and sealing member are at an angle to the body and are directed toward the valve member to be generally perpendicular to a spherical shaped seating surface on the valve member.

Yet a further object of the present invention is the provision of a valve having a passageway therethrough, an annular sealing member positioned in a recess around the passageway, a dish-shaped valve member rotatably supported in the passageway wherein an annular metal shoulder is provided adjacent to sealing member on the side opposite the valve member to support the seal and prevent it from being extruded downstream as well as providing a metal shoulder for sealing with the valve member.

A still further object of the present invention is the provision of a valve having a passage therethrough, a dish-shaped valve member rotatably supported in the passageway, and a seating surface on the valve member shaped in cross section as a segment of a sphere and the valve member is rotatably supported upstream from the plane of the sphere segment.

Yet a still further object of the present invention is the provision of a check valve having a dish-shaped valve member which is rotatably supported in a valve in a horizontal plane above the horizontal axis of the valve member when the valve is in a closed position and stop means limiting the rotation of the valve member in either direction.

A still further object of the present invention is the provision of a dish-shaped valve member having a spherical shaped seating surface which seats on an annular trapezoidally shaped seal having a portion of a hardness sufficient to hold the seal secured to the valve body even against high differential pressures and having a softer sealing portion to provide an easily sealable seat.

Yet a further object of the present invention is the provision of a dish-shaped butterfly valve having a spherical shaped seating surface and which includes an annular seal located on each side of the valve member so the valve member may be rotatably positioned so that the high pressure acts against the convex side regardless of the direction of flow.

Other and further objects, features, and advantages will be apparent from the following description of presently preferred embodiments of the invention, given for the purpose of disclosure, and taken in conjunction with the accompanying drawings, where like character references designate like parts throughout the several views and where, FIGURE 1 is an elevational view, in cross section, illustrating the valve of the present invention when used as a butterfly valve, FIGURE 2 is a cross sectional view taken along the line 2—2 of FIGURE 1, FIGURE 3 is a cross sectional view of the valve of FIGURE 1 including seals on both sides of the valve element, FIGURE 4 is an elevational view of the valve of the present invention when used as a check valve, FIGURE 5 is an elevational view, in cross section of the valve of FIGURE 4 in its closed position, FIGURE 6 is a side elevational view, in cross section of the valve of FIGURES 4 and 5 shown in the open position, and FIGURE 7 is an enlarged cross sectional view of an annular dual hardness seal that may be in the valves of the present invention.

Referring now to the drawings, and in particular to FIGURES 1, 2 and 3, the reference numeral 10 generally designates the valve of the present invention and generally includes a valve body 12 having a passageway 14 therethrough for the flow of fluid, a valve member 16 rotatably supported in the passageway for controlling the flow of fluid therethrough and an annular sealing member 18 for making contact with the seating surface on the valve member 16 when the valve member is in its closed position.

The valve member 16 is rotatably mounted such as on shafts 20 and 22 which are suitably journaled and sealed in the valve body 12. A suitable handle 24 is connected to the shaft 22 for opening, closing or suitably positioning the valve member 16.

It is to be noted that the valve 16 is a disc which is dish shaped so that the convex side 26 can be positioned to be facing upstream when the valve member 16 is closed and with the concave side 28 facing downstream. Thus, while the valve member 16 is made of a conventional metal material in spite of the fact that it is secured to the shafts 20 and 22 on either side, there will still be a slight flexing of the dish-shaped member 16 due to high pressures acting against the convex side 26 which will tend to expand the outer edges of the member 16 thereby increasing the sealing action between the valve member 16 and the sealing member 18 and a shoulder 36 as will be more fully explained.

Referring now to the seating surface around the periphery of valve member 16 it is to be particularly pointed out that this seating surface is a segment of a sphere which provides a ball joint type action when the valve member 16 is rotated. Additionally, it is to be noted that this sphere segment shaped seating surface 30 tends to be pressed outwardly by any flexing action of the valve member 16 into a tighter sealing engagement with the annular seal 18 and shoulder 36 and more importantly acts in an outward direction to prevent extrusion of the seal 18 downstream. That is, by the action of the valve member 16 and spherical seating surface 30 the annular seal 30 is pushed outwardly and upstream and not downstream.

The annular sealing member 18 is positioned in a recess 32 in the valve body 12. If desired, the body may comprise a two piece structure 32 and 34 whereby the recess 32 may be conveniently on one edge of one of the structural components for ease of inserting the sealing member 18 into the recess 32. Preferably, the recess 32 and the sealing member 18 are trapezoidally shaped in cross section thereby providing a structure which securely holds the sealing member 18 in position in the recess 32 and prevents it from being sucked out in the event of high pressure differential across the seal 18. It is to be further noted that while the annular seal 18 is positioned in a transverse plane to the body 12 that the axis of the cross section of the seal 18 is at an angle to the valve body 12 and is directed upstream so as to be approximately perpendicular to the spherical segment seating surface 30. This angle thereby allows the seal 18 to be pushed into the recess 18 by member 16 thereby increasing the sealing effect between the sealing member 16 and the seal 18 and this sealing effect is in a direction which will not extrude the seal 18 around the sealing surface 30 and downstream. The annular seal 18 may be made out of any suitable sealing material and is preferably resilient to some extent such as rubber or any suitable plastic.

Referring specifically to FIGURES 2 and 3, it is to be noted than an annular metal shoulder 36 is provided adjacent to and on the downstream side of the annular seal 18. The metal shoulder thus supports the seal 18, prevents it from being extruded downstream and in addition provides a metal surface to contact the spherical seating surface 30 after the valve member has been seated in its closed position and compresses the sealing member 18 into the recess 32. Thus, a metal to metal seal is provided which backs up and supports the action of the flexible sealing member 18 against the valve member 16.

It is desirable that the convex side 26 of the valve member 16 be directed upstream so that the higher pressure will act against the member 16 in a direction to increase the sealing action. Therefore, in the event the butterfly valve shown is to be used in a line where the fluid flow changes direction an additional and identical seating seal 18 will be positioned on both sides of the valve member 16 so that the member 16 may be rotated and seated at all times with the convex portion 26 directed upstream regardles of the direction of flow through the valve 10.

While the present valve structure may be used as a butterfly valve as shown in FIGURES 1–3, it can be similarly used with other types of valves, as for example a check valve. Referring now to FIGURES 4–6 the valve structure of the present invention is shown in use as a check valve, the letter *a* being added to those parts corresponding to those in FIGURES 1–3 for convenience of reference. Thus, a valve 10*a* having a valve body 12*a* is provided in which a dish-shaped valve member 16*a* is rotatably supported in a passageway 14*a* and seats against an annular sealing member 18*a* and shoulder 36*a* when the pressure on the concave side of the valve member 16 is less than the pressure on the convex side 26*a*.

The valve member 16*a* is pivotally supported by shafts 40 and 42 which are positioned in a horizontal plane above the horizontal axis of the valve member 16*a*. This provides that the member 16*a* is eccentrically supported around the support shafts 40 and 42 so as to close when the pressures on either side are substantially the same. In addition, a suitable counterweight 44 is provided on the convex side 26*a* to assist in normally closing the valve member 16*a*. Since the check valve is controlled by the fluid pressures on either side of the valve member 16*a* suitable stops are provided to limit the direction of rotation of the valve member 16*a* on either direction. Thus, a stop member 46 is provided to contact the convex side 26*a* of the member 16*a* and hold it in the proper position for sealing against the seal 18*a* and the metal shoulder 36*a*. Similarly, a stop shoulder 48 is provided on the valve member 16*a* to contact a body shoulder 50 so as to limit the counterclockwise rotation of the valve member 16*a* thereby preventing the member 16*a* from rotating to a position where is could be held open at all times. It is to be noted that the back pressure on the check valve member 16*a* acts to press the spherical segment seating surface 30*a* into contact with the annular seal 18*a* similarly to the butterfly valve of FIGURES 1–3 and thereby provides a structure which increases the sealing action as the pressure increases but yet insures that the flexible seal 18*a* will not be extruded downstream but will be forced outwardly into its recesses 32*a* and even slightly upstream. The metal shoulder 36*a* will further support the seal 18*a* and prevent it from being pushed downstream.

It is to be noetd from FIGURES 2, 3 and 5, that the seal 18 and 18*a* when engaged by the valve member 16 is compressed into its recess and is also extruded upstream to seal on the upstream side against static pressure in the valve body 12 and 12*a* thereby providing an additional retaining force tending to keep the annular seal in place.

In addition the seal 18 may be a seal of dual hardness, as best seen in FIGURE 7. In the case where a valve closes with a high differential pressure, which is particularly true with a butterfly valve, the effect is to suck the seal out of its seat. But by providing a base 17 of a harder material, such as 100 durameter rubber, a great degree of strength may be added to the seal 18 to enable it to resist the force attempting to pull it from its seat. And a softer portion, a face 19, is provided, such as 70 durameter rubber, to provide a more easily deformable and thus an easily sealable portion.

In operation, and referring to the butterfly valve structure shown in FIGURES 1–3, the handle 24 may be suitably operated to place the valve member 16 in an open, closed, or throttling position. The seating surface 30 which forms a spherical segment provides a suitable rotating contact with the annular seal 18 adjacent the rotatable supporting shafts 20 and 21 and thus will not damage the seal 18. The seating member 16 is placed in a closed position in a direction so that the pressure acting against the member 16 acts to push the convex face 26 inwardly thereby pushing the spherical segment seating surfaces 30 outwardly against the flexible seal 18 and increasing the sealing action. Seal 18 may also be made so as to provide strength. This may be accomplished by bonding a soft inner sealing face 19 to a much harder and much less resilient rubber base 17 as best seen in FIGURE 7. It is particularly noted that both because of the direction of the cross sectional axis of the sealing member 18 and the recess 32 and the containment of the seal 18 by the metal shoulder 36 that the seal 18 is pushed outwardly and not downstream of and extruded about the member 16. The metal shoulder 36 in addition to providing a downstream support for the sealing member 18 also is provided and positioned to contact the member 16 to provide a metal to metal seal against which flexible seal member 18 acts to fully seal off the valve structure. In addition, dual seals such as shown in FIGURE 3 may be installed within the valve so as to provide sealing facilities for flow in either direction.

The check valve embodiment shown in FIGURES 4–6 utilizes the structure of the present invention and is in the open position when the flow is towards the concave face of the valve member 16a thereby pivoting the member about the supporting shafts 40 and 42 to place the valve 10a in the open position. The member 16a is prevented by stop shoulders 48 and 50 from swinging past the horizontal position in a counterclockwise direction and blocking the flow of fluid through the valve. When the fluid pressure on the convex side of the valve member 16a increases to approximately the value of the pressure on the concave side of the valve element 16a will pivot downwardly thereby closing the valve member 16a and seating it and the spherical seating surfaces 30a against the flexible sealing means 18a and against the metal shoulder 36a. Stop shoulder 46 contacts the convex side of the valve member 16a and insures that the valve member does not go past the preferred closed position.

The present invention, therefore, is well suited to carry out the objects and attain the ends and advantages mentioned as well as others inherent therein. While presently preferred embodiments of the invention are given for the purpose of disclosure, numerous changes in the details of construction and arrangement of parts may be made which will readily suggest themselves to those skilled in the art and which are encompassed within the spirit of the invention and the scope of the appended claim.

What is claimed is:

A valve comprising,
- a valve body having a passageway therethrough, said body having an annular recess about said passageway,
- an annular resilient sealing member positioned in said recess, said recess and sealing member being trapezoidally shaped in cross-section,
- a metal valve member rotatably supported in said passageway on the high-pressure side of said sealing member for closing said passageway,
- said valve member being dish-shaped and positioned in its closed position with the concave side directed toward the sealing member,
- an annular metal shoulder adjacent to the sealing member on the low pressure side for supporting said sealing member and contacting the valve member when in the closed position to provide a load bearing metal to metal seal and which supports the sealing member and prevents it from being extruded downstream,
- a seating surface on said valve member being shaped in cross-section as a segment of a sphere with the convex face position to contact the sealing member and metal shoulder, and
- the recess and sealing member being in a plane perpendicular to the body with the vertical axis of the cross-section of the recess and sealing member being at an angle to the body and generally perpendicular to the valve member seating surface.

References Cited by the Examiner

UNITED STATES PATENTS

| | | | |
|---|---|---|---|
| 2,711,188 | 6/1955 | Nicherson | 137—527.8 |
| 2,820,605 | 1/1958 | Dougherty | 251—307 X |
| 2,886,062 | 5/1959 | Wheatley | 251—306 X |
| 2,888,036 | 5/1959 | Reppert | 251—175 X |
| 2,941,779 | 6/1960 | Saar | 251—175 |
| 3,081,791 | 3/1963 | Wheatley | 251—172 X |
| 3,235,224 | 2/1966 | Grove | 251—328 X |

FOREIGN PATENTS 746,909   3/1956   Great Britain.

WILLIAM F. O'DEA, *Primary Examiner.*

CLARENCE R. GORDON, *Examiner.*